US008224602B2

(12) United States Patent
Lory et al.

(10) Patent No.: US 8,224,602 B2
(45) Date of Patent: Jul. 17, 2012

(54) AUTOMATIC ON-DEMAND PRESCALE CALIBRATION ACROSS MULTIPLE DEVICES WITH INDEPENDENT OSCILLATORS OVER AN I²C BUS INTERFACE

(75) Inventors: Jay Richard Lory, Chandler, AZ (US); Alma Stephenson Anderson, Chandler, AZ (US)

(73) Assignee: NXP B.V., Eindhoven (NL)

( * ) Notice: Subject to any disclaimer, the term of this patent is extended or adjusted under 35 U.S.C. 154(b) by 536 days.

(21) Appl. No.: 12/408,279

(22) Filed: Mar. 20, 2009

(65) Prior Publication Data

US 2010/0122002 A1 May 13, 2010

Related U.S. Application Data

(63) Continuation-in-part of application No. 12/269,018, filed on Nov. 11, 2008, now Pat. No. 7,930,127.

(51) Int. Cl.
*G06F 13/00* (2006.01)
*G06F 13/42* (2006.01)

(52) U.S. Cl. .............. 702/75; 702/106; 702/78; 702/79; 710/110

(58) Field of Classification Search ............... 702/75, 702/106, 78, 79
See application file for complete search history.

(56) References Cited

U.S. PATENT DOCUMENTS

| 6,282,673 | B1 | 8/2001 | Liu et al. | |
|---|---|---|---|---|
| 6,339,806 | B1* | 1/2002 | Foster et al. | 710/313 |
| 6,704,770 | B1 | 3/2004 | Ramakesavan | |
| 6,799,233 | B1 | 9/2004 | Deshpande et al. | |
| 7,349,512 | B2 | 3/2008 | Rausch et al. | |
| 7,606,956 | B2 | 10/2009 | Deshpande et al. | |
| 7,849,244 | B2* | 12/2010 | Huang et al. | 710/110 |
| 7,930,127 | B2* | 4/2011 | Lory et al. | 702/106 |
| 2004/0225813 | A1 | 11/2004 | Ervin | |
| 2005/0246475 | A1* | 11/2005 | Ervin | 710/306 |
| 2005/0281367 | A1 | 12/2005 | Lesso | |
| 2007/0156936 | A1 | 7/2007 | Boecker et al. | |
| 2009/0031065 | A1* | 1/2009 | Travers et al. | 710/110 |

FOREIGN PATENT DOCUMENTS

| EP | 1 280 024 A1 | 1/2003 |
|---|---|---|
| GB | 2 409 383 A | 6/2005 |
| WO | 03/013051 A2 | 2/2003 |
| WO | 2006/029511 A1 | 3/2006 |
| WO | 2008031234 A1 | 3/2008 |

OTHER PUBLICATIONS

UM10204 I²C-Bus Specification and User Manual, rev. 03, NXP Semiconductors, 50 pgs. (Jun. 2007).

* cited by examiner

*Primary Examiner* — Hal Wachsman

(57) ABSTRACT

A system and method for synchronizing otherwise independent oscillators private to I²C Bus slave devices. An I²C Bus master device can issue two new general call commands, CALIBRATE and ZERO COUNTERS. The I²C Bus slave devices respond to the CALIBRATE command by counting the number of cycles its local, private oscillator makes through during the communication transfer period of the CALIBRATE command on the I²C Bus. All such I²C Bus slave devices measure the same communication transfer period on the I²C Bus, so the differences in the digital measurements obtained by each of them are proportional to their respective oscillator frequencies. The digital measurements are privately used by each I²C Bus slave device to calculate appropriate oscillator prescale factors, and to automatically load the values that will harmonize the final product frequencies of all of the local oscillators on all of the I²C Bus slave devices in the system.

9 Claims, 12 Drawing Sheets

| S | A6 | A5 | A4 | A3 | A2 | A1 | A0 | R/W̄ | A | D7 | D6 | D5 | D4 | D3 | D2 | D1 | D0 | A | P |
|---|----|----|----|----|----|----|----|-----|---|----|----|----|----|----|----|----|----|---|---|
|   | 0  | 0  | 0  | 0  | 0  | 0  | 0  | 0   |   | 0  | 0  | 0  | 0  | 1  | 1  | 0  | 0  |   |   |
|   | GENERAL CALL (WRITE) ||||||||| | RESET PRESCALE COMMAND ||||||||| |

FIG. 5

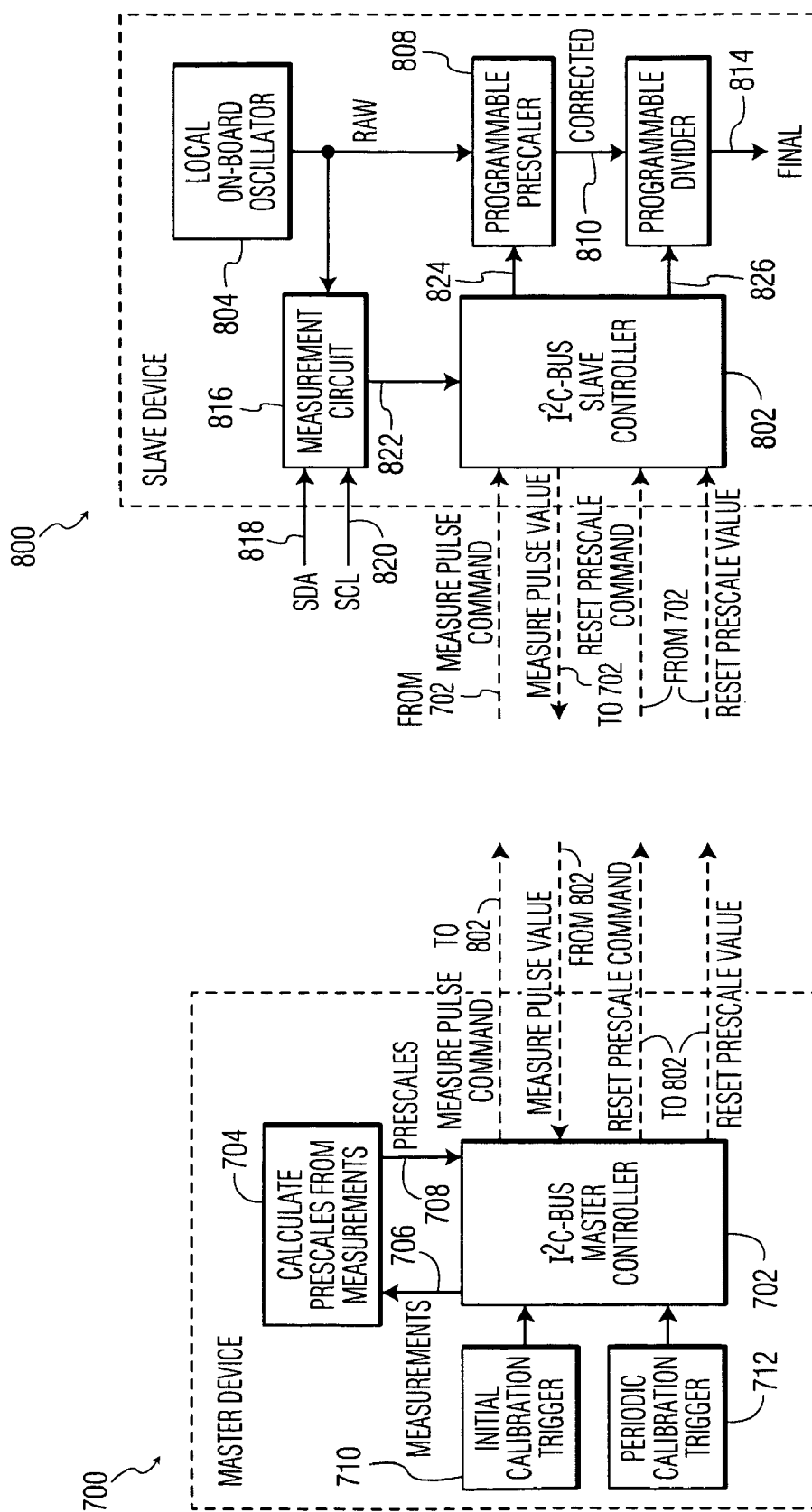

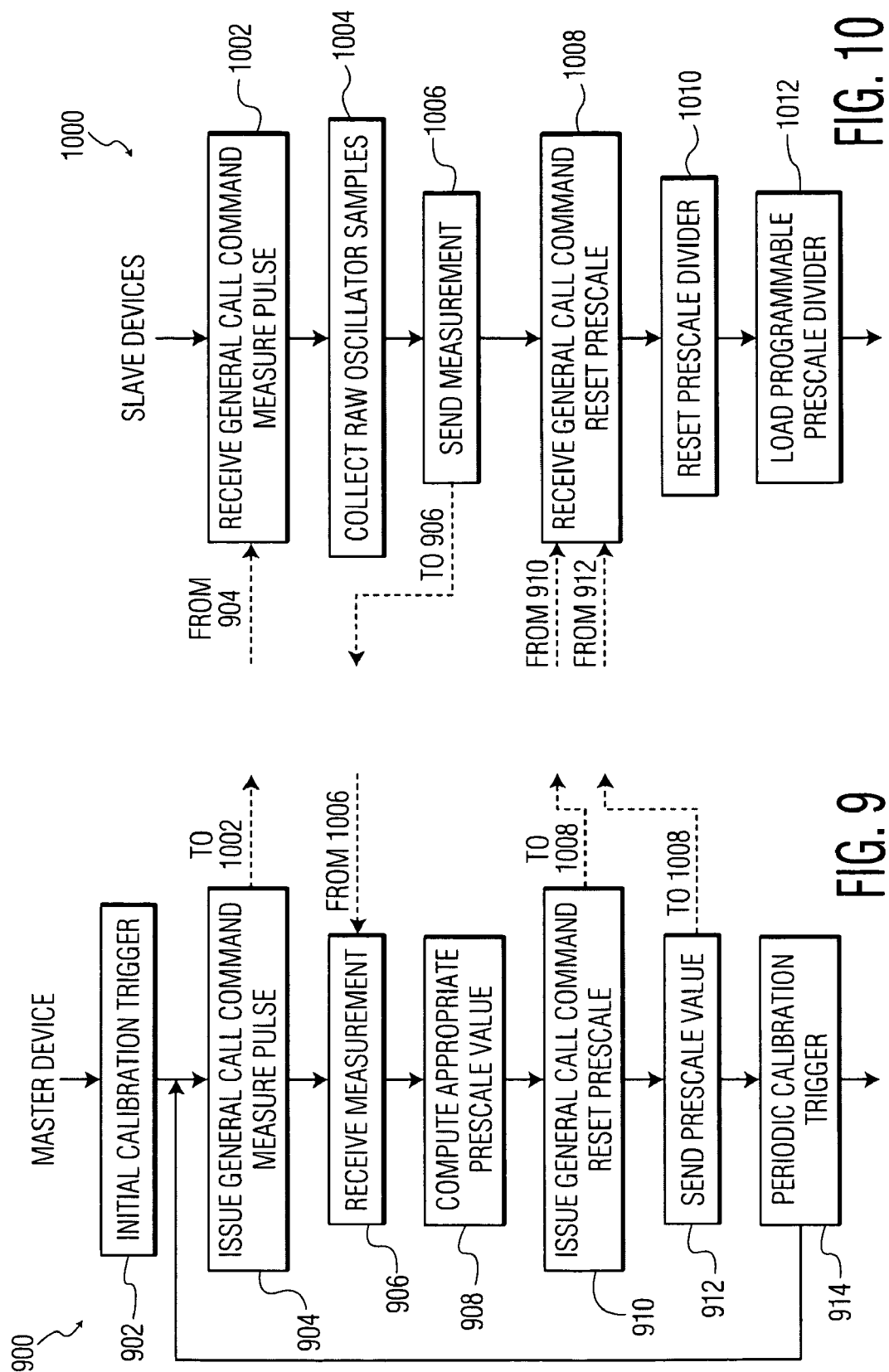

AUTOMATIC ON-DEMAND PRESCALE CALIBRATION ACROSS MULTIPLE DEVICES WITH INDEPENDENT OSCILLATORS OVER AN I²C BUS INTERFACE

RELATED APPLICATION

This application is a Continuation-In-Part of Parent Application, OSCILLATOR PRESCALE CALIBRATION FOR HARMONIZING MULTIPLE DEVICES WITH INDEPENDENT OSCILLATORS OVER AN I2C BUS INTERFACE, U.S. patent application Ser. No. 12/269,018, filed Nov. 11, 2008, now U.S. Pat. No. 7,930,127.

The invention relates generally to methods and devices for harmonizing independent oscillators on slave devices in industry-standard inter-integrated circuit (I²C) Bus applications, and more particularly to automating the harmonization of such frequencies without requiring significant user involvement.

Many I²C devices utilize independent, low-cost, low-power, un-calibrated oscillators for timing functions. Such oscillators can vary as much as ±40% in their nominal frequencies due to process, operating voltage, and temperature variations. An obvious solution when frequency harmonization is needed is to clock all the devices with a single external system clock. But this requires an extra pin on the device, and that particular solution may add too much expense and/or push the manufacturing of the device into requiring a larger more expensive package.

The Parent Application to this one describes a method of using standard I²C commands and signals to determine an individual device's oscillator frequency, to calculate a new prescale value, and then to write the new prescale value back into the device. But such method can necessitate significant user action. What is needed is a method and device that require the user to supply something quite simple, e.g., the desired frequency of a SCL clock, e.g., using an I²C Calibration command.

LED devices are now being widely used to replace conventional lamps in vehicle turn signals and taillights, advertizing signs, cellphones, etc. Sometimes many individual LED devices are used to replace a single incandescent lamp in applications that require blinking, dimming, or on-off operation. That job often falls on LED drivers that are controlled by signals on I²C Buses. One example of a conventional device is the NXP PCA963x series of blinkers.

In conventional LED blinking applications, getting all of the LEDs to dim or blink on-off together at the same instant has been troublesome. Many I²C devices include their own oscillators followed by fixed prescalers and programmable dividers for timing functions. Having an on-board oscillator can reduce the traffic on the I²C Bus by eliminating the need to explicitly command every on-off operation by a master device to a slave device. An exemplary prior art device has a 25-MHz oscillator, with a ±30% frequency variability, followed by a programmable prescaler that defaults to a divide-by-1024, and a fixed divide-by-two and a fixed divide-by-512 divider. The blink frequency, at a default prescale factor of 1024, is therefore 23.84 Hz. The output is used to control when an LED will actually blink on or off.

However, because the typical on-board oscillators are low-cost, low-power, and un-calibrated, they can have wide device-to-device frequency variations of up to ±40%. The device-to-device frequency variations are hard to control because they result from process, operating voltage, and temperature differences. So in side-by-side applications of the same I²C device, it is possible for a first device to have an oscillator that runs at 25.00 MHz, the second at 32.50 MHz, and the third at 17.50 MHz. So, sending the same I²C command to multiple LEDs to prescale each device by 1024 would result in blink frequencies of 23.84 Hz, 31.00 Hz, and 16.69 Hz, respectively. Those differences could cause problems that will be very visible to users watching the LEDs being controlled. Conventional I²C devices do not allow the consequential output frequencies to be readback, checked, or calibrated.

In a typical application, an equation for the Blink Rate resulting in the example would be, (N+1)/BlinkFrequency, where N is a factor that is programmed into a blink rate register that controls a timer. If a user wanted three LEDs to blink together at a 1.00 Hz rate, the ideal blink frequency would be 24.00 Hz, and the ideal oscillator frequency before prescaling would be 25.16582 MHz (24 Hz×512×2×1024). So N needs to be "23", and that factor would normally be loaded into a blink rate register using I²C commands. But because of the variability in the on-board oscillator frequencies, the actual blink rates for the three devices in the example would be: (23+1)/23.84 Hz=1.0067 seconds; (23+1)/31.00 Hz=0.7742 seconds; and, (23+1)/16.69 Hz=1.438 seconds. The differences would be highly visible to the human eye.

One solution would be to eliminate the independent on-board oscillators and clock all of the I²C devices with one external system clock, but that would require putting an extra pin on each device. Adding pins to devices requires larger more complex packages, and that can make each device more expensive to produce. What is needed are solutions that do not require adding more pins to standard devices.

In an embodiment, standard I²C commands and signals are used to set an individual I²C device's oscillator frequency, to calculate a new prescale factor, and to write the necessary prescale factor back into the device.

A system, device, protocol, and method for on-demand prescale calibration across multiple devices with independent oscillators over an I²C Bus are described. New I²C general call commands MEASURE PULSE and RESET PRESCALE are included to be able to obtain a measurement from an oscillator in a number of slave devices, and for a master device to compute and load appropriate prescale factors for use in the oscillator prescaler of the corresponding slave devices. In one embodiment, the slave devices independently control individual LEDs that need to be blinked and dimmed in unison. Other embodiments of the system and method are also described.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 illustrates a serial bit structure for the RESET PRESCALE general call command embodiment.

FIG. 7 illustrates a master device embodiment which can issue the MEASURE PULSE and RESET PRESCALE commands, and calculate an appropriate prescale factor for a group of slave devices.

FIG. 8 illustrates a slave device embodiment which can respond to the MEASURE PULSE and RESET PRESCALE commands, and is able to accept an appropriate prescale factor that was computed for it in particular.

FIG. 9 illustrates a flowchart for a method embodiment which can issue the MEASURE PULSE and RESET PRESCALE commands, and calculate an appropriate prescale factor for a group of slave devices.

FIG. 10 illustrates a flowchart for a method embodiment which can respond to the MEASURE PULSE and RESET PRESCALE commands, and is able to accept an appropriate prescale factor that was computed for a particular slave device.

Throughout the description, similar reference numbers may be used to identify similar elements.

Figure 1:
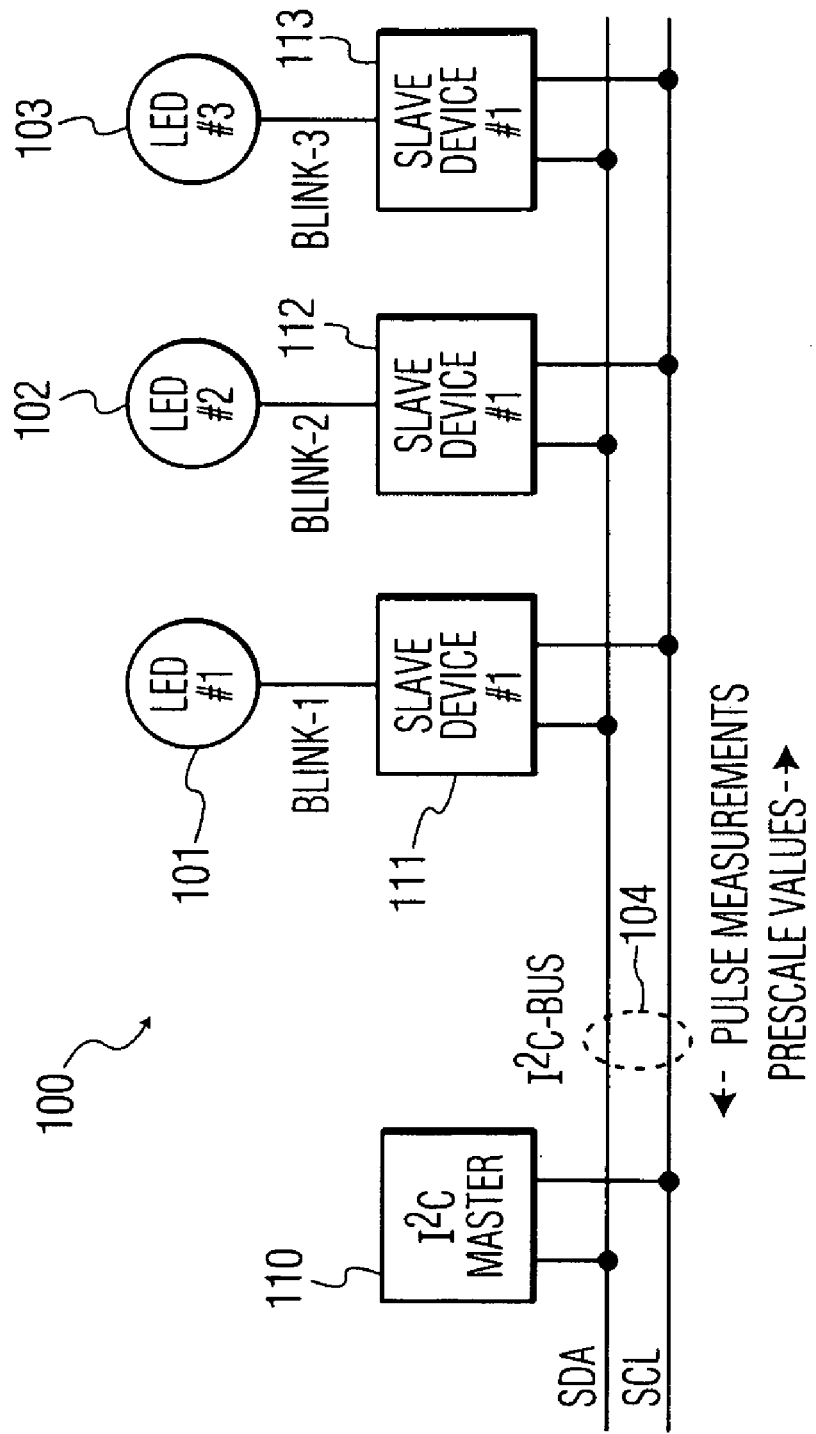
FIG. 1 illustrates an embodiment of an I²C system in which a master device and many slave devices are able to issue and respond to new I²C general call commands MEASURE PULSE and RESET PRESCALE.

In the following description, specific details of various embodiments are provided. However, some embodiments may be practiced with less than all of these specific details. In other instances, certain methods, procedures, components, structures, and/or functions are described in no more detail than is necessary to enable the various embodiments of the invention, e.g., for the sake of brevity and clarity.

While particular embodiments are described herein, there are no doubt many ways in digital hardware and computer software to accomplish the same ends. In all embodiments, the methods and circuits include reading a test count of the number of frequency ticks that a slave device's on-board oscillator produces during a standard pulse width observable by all slave devices and master devices on an I²C Bus. Then computing and loading an appropriate prescale factor to use on each respective on-board oscillator that will harmonize and coordinate them all. Some embodiments use I²C general call commands to effectuate the measurement, calculating, and loading. Other embodiments could use different methods of command. Still further embodiments may need to harmonize and coordinate their on-board local oscillator frequencies to blink or dim LEDs in unison, and alternative embodiments do it for purposes particular to their applications that have nothing at all to do with LEDs.

FIGS. 1-10 and their corresponding descriptions here are exactly as presented in the Parent Application, and are repeated here instead of incorporating the material by reference. The characterizing aspects of the present methods and devices begins with FIG. 11.

The I²C Bus uses bi-directional serial clock (SCL) and a serial data (SDA) lines to communicate in half-duplex mode on two wires and a ground. Four transfer rates are possible: standard, 100 kbps [bits per second]; fast, 400 kbps; high speed, fast plus, 1 Mbps; and 3.4 Mbps. The I²C Bus interface uses 8-bit long bytes, and each device has a unique address. Any device may be a transmitter or receiver, and a master device or slave device. Herein, calling a particular device a slave device or a master device is only a temporary label to help better describe which device at any one instant is controlling another device.

Data and clock are sent from a Bus master device, and the data is valid while the clock line is high. The link may have multiple master devices and slave devices on the bus, but only one master device is allowed to control the I²C Bus at any one time. Slaves may receive or transmit data to the master device. Operating power voltages, $V_{DD}$, may be different for each device, and all devices use pull-up resistors on open-drain outputs to the I²C Bus.

Before any transaction can proceed on the I²C Bus, a START condition must be issued. The device issuing the START condition pulls the SDA data line (data) line low, and then pulls the SCL clock line (clock) line low. The START condition acts as a signal to every device that something is about to be transmitted on the bus. All devices connected listen to the bus to see if they are to be involved in the upcoming transaction.

After a message has been completed, a STOP condition is sent in which the Bus master device releases the SCL clock line and then releases the SDA data line. This is the signal for all devices on the bus that the bus is available for a new master device. Any device that received data during the last transaction can then begin processing it.

Once the START condition has been sent, a byte can be transmitted by the master device to the slave device. This first byte after a START condition will identify the slave device on the I²C Bus by its address, and will select a mode of operation. The meaning of the bytes that follow depend on the slave device. A number of addresses have been reserved for special purposes. One of the reserved addresses is used to switch to a 10-bit, Extended Addressing Mode. If a standard slave device that is not able to resolve extended addressing receives this address, it won't do anything (since it's not its address). If there are slave devices on the I²C Bus that can operate in the extended 10-bit addressing mode, they will all respond to the ACK cycle issued by the master device. The second byte that gets transmitted by the master device will then be taken in and evaluated against their address.

When addresses or data bytes have been transmitted onto the I²C Bus, they must be ACKNOWLEDGED by a slave device. A slave device can respond to the address with an ACK only if the address matches. When a data byte is transmitted to an already addressed slave device, then that slave device will be the one to respond with an ACK. The ACK consists of pulling the SDA data line low immediately after reception of the eighth bit transmitted. Or, in case of an address byte, immediately after the evaluation of its address. As soon as a master device pulls the SCL clock line low to complete the transmission of the bit, the SDA data line is pulled low by the slave device. The master device then issues a clock pulse on the SCL clock line. The slave device releases the SDA data line at the end of the clock pulse. The bus is then available for the master device to continue sending data or to generate a stop.

In a GENERAL CALL, all devices on the bus are addressed. If a device does not need the information provided, it simply issues a not-acknowledge. A second byte in the GENERAL CALL includes a special command. The conventional commands are described in the I²C Bus Specification, e.g., as published in June 2007 as Version 03 by NXP Semiconductors.

In one embodiment, the divide-by-1024 default used in a device's programmable prescale register is made programmable with an appropriate factor that is calculated to compensate for its oscillator's actual frequency. A target device's oscillator clock frequency must therefore be readable, e.g., over the I²C Bus, such as by using I²C Bus commands. Once the raw clock frequency is sampled, an I²C master device can calculate an appropriate prescale factor to correct it, and load the prescale factor into the target slave device's prescale register.

FIG. 1 illustrates a system 100 in which there are three LEDs 101-103 that need to seemingly blink in sync with one another. An I²C Bus 104 includes an SDA data line 106 and an SCL clock line 108. A master device 110 has control of the I²C Bus and is able to issue commands to slave devices 111-113. Embodiments are able to issue general call commands that order the slave devices to take frequency measurements of their respective oscillators, and then return the measurements to the master device 110. The master device 110 computes a prescale factor for each slave device 111-113, and commands the slave devices to accept these prescale factors.

Figure 2:
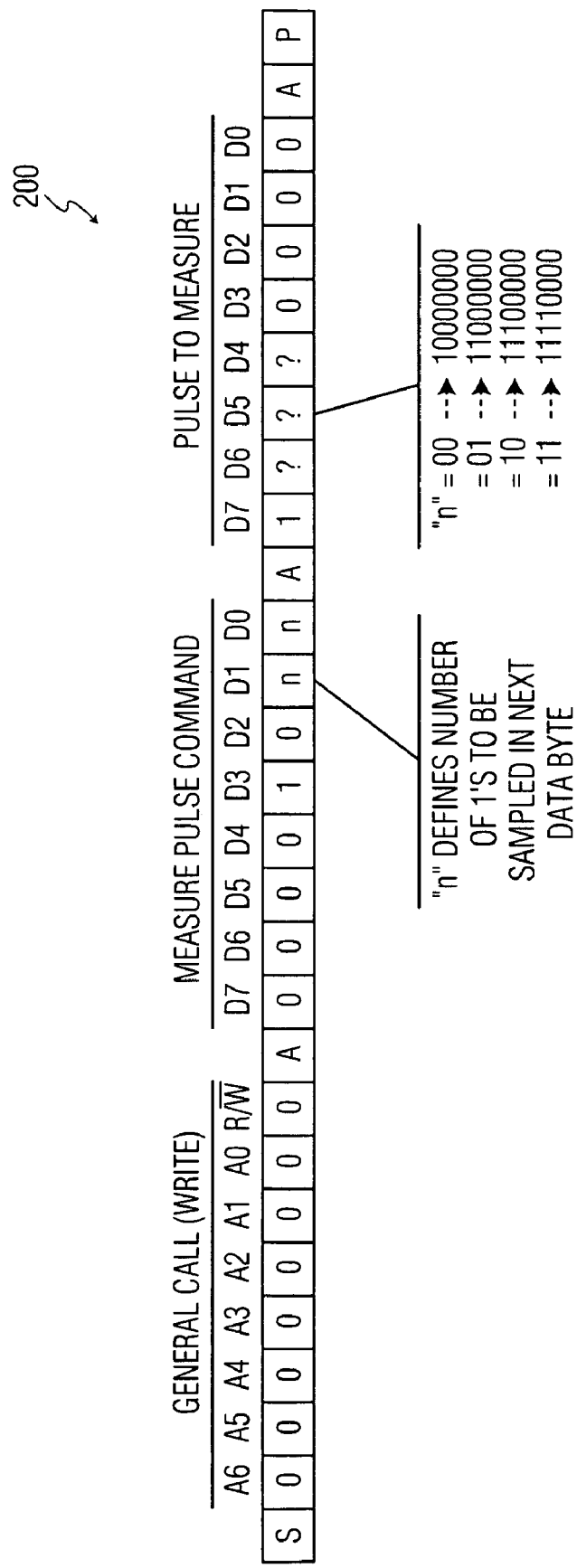
FIG. 2 illustrates a serial bit structure for the MEASURE PULSE general call command embodiment.

Embodiments therefore include two new I²C Bus GENERAL CALL commands. FIG. 2 illustrates a first command, e.g., a MEASURE PULSE command 200, and is shown in a bit-serial I²C data flow format. Two bits in the command, labeled n, define the number of 1's to be sampled in the next data byte. It is set based on the I²C Bus SCL clock line frequency. The start bit is labeled S, acknowledge is A, and stop is P.

Figure 3:
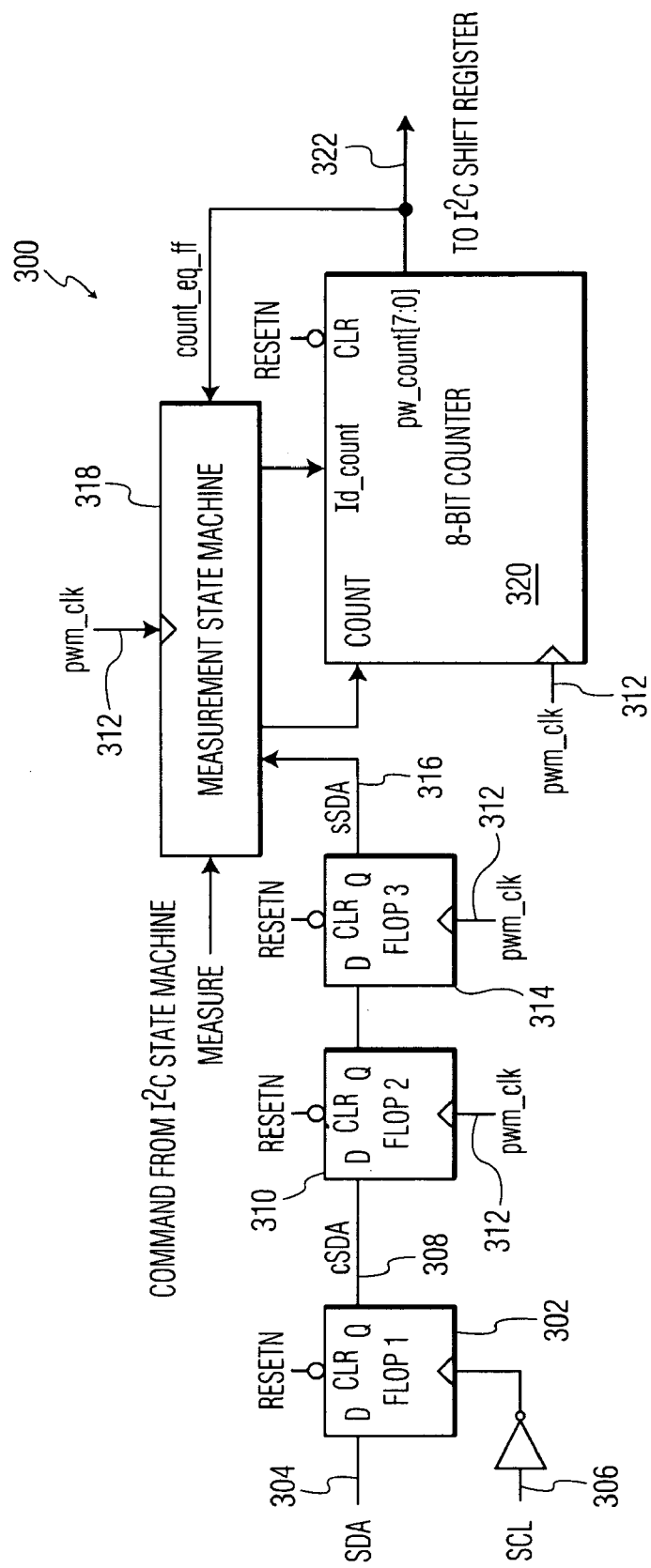
FIG. 3 illustrates a circuit for implementation in a slave device embodiment that can measure a corresponding on-board oscillator frequency.

FIG. 3 illustrates a circuit 300 that can be used on-board each slave device 111-113 to measure its private oscillator frequency. Circuit 300 does this indirectly by using a time base (pwm_clk) derived from the on-board oscillator to measure the width of the I²C Bus command data pulse observable on the SDA data line and SCL clock lines 106 and 108. Such command data pulse is visible to all I²C devices in parallel because they all connect to the same SDA data line and SCL clock line, and such serves here as a common reference by which to measure. Any on-board measurement differences can therefore be attributed 100% to the unique individual differences in each slave device's oscillator frequency.

A first flip-flop 302 has its D-input connected to the SDA data line 304 and is triggered by SCL clock line 306. The first flip-flop produces a "cSDA" signal 308 that is connected to the D-input of a second flip-flop 310. A "pwm_clk" signal 312 from the oscillator on-board the I²C device is used to trigger all of the other devices. Since the command data pulses observed on the SDA data line 304 and SCL clock line 306 will be the same for all devices on a particular I²C Bus, it is the frequency of the pwm_clk signal 312 that is really being measured by circuit 300. Flip-flops 310 and 314 are used to synchronize the cSDA signal 308 data into the pwm_clk domain, to arrive at an "sSDA" signal 316 for a measurement state machine 318. An 8-bit counter 320 is used to produce a digital measurement 322 for an I²C shift register that can be read by an I²C Bus master device. Counting is stopped in counter 320 if the count reaches 255 (FF hex), which is an overflow condition.

Figure 4:
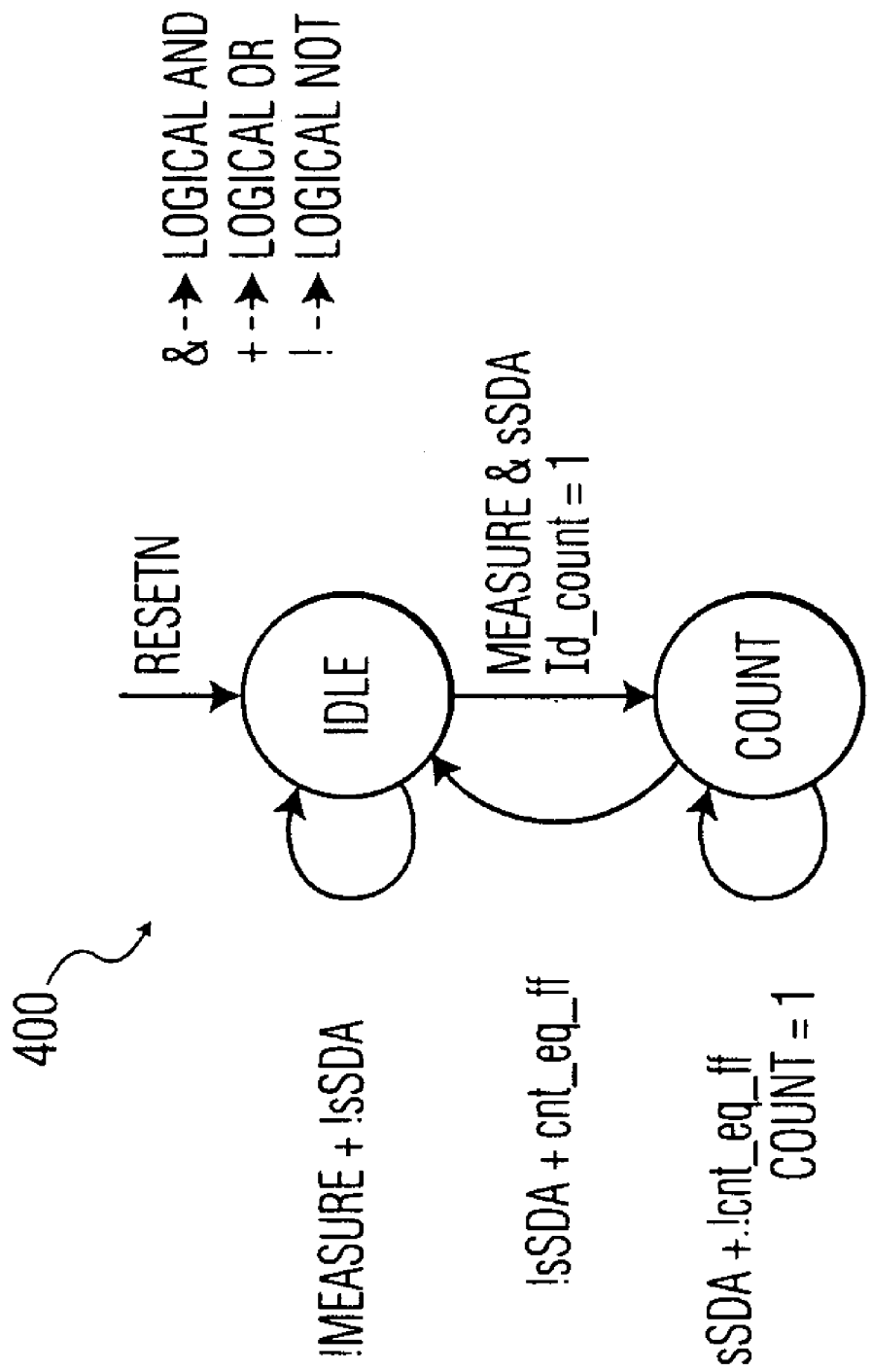
FIG. 4 illustrates a state machine logic useful in the measurement state machine of FIG. 3.

FIG. 4 illustrates the logic of a state machine 400 that can be included in the measurement state machine 318 of FIG. 3.

FIG. 5 illustrates the second of the new I²C Bus commands included in the embodiments, e.g., a RESET PRESCALE command 500. The first byte of the general call command is all zeroes, e.g., 00000000, indicating a write byte follows. The next byte is the 8-bit prescale factor to load into the prescale register in the slave device.

Figure 6:
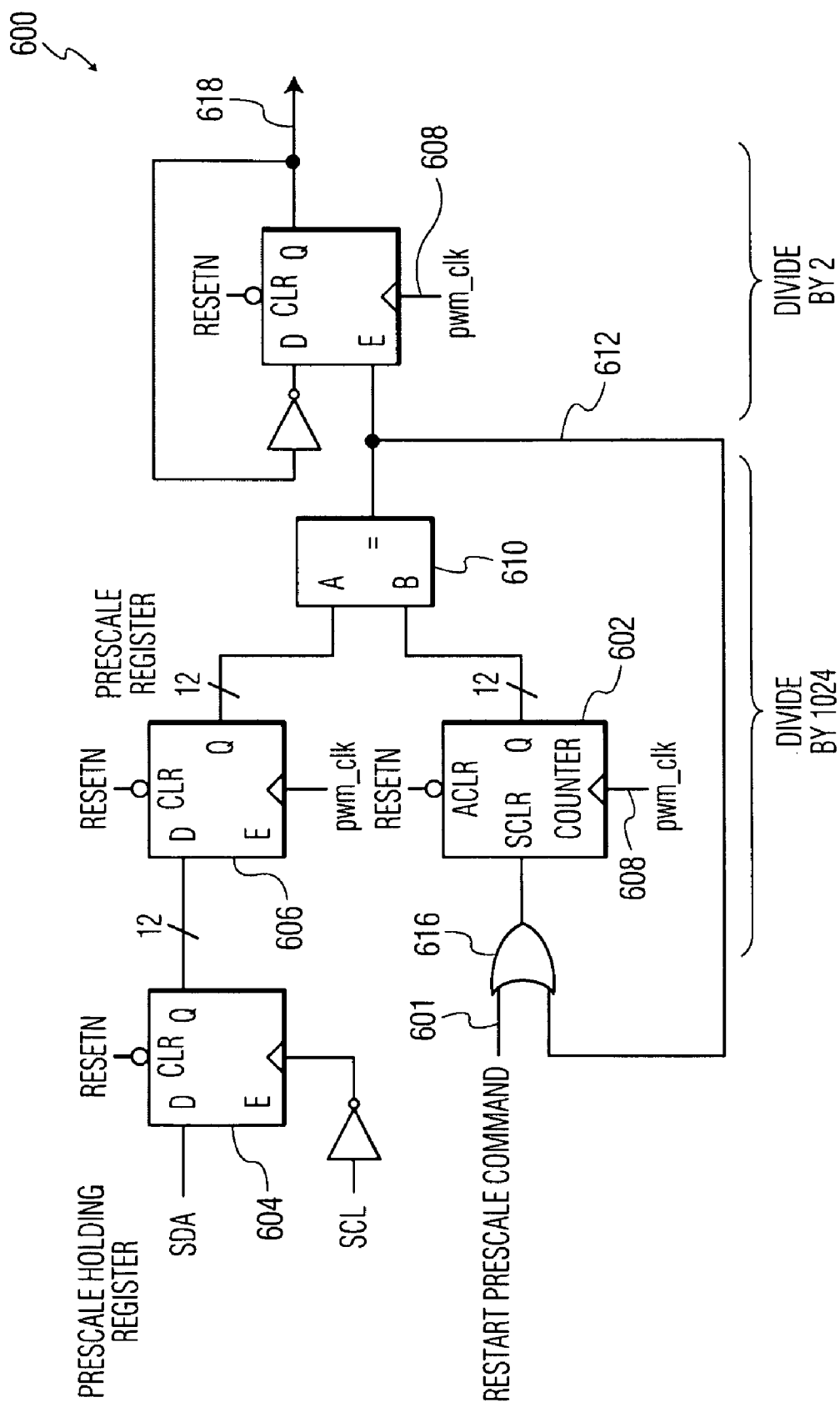
FIG. 6 illustrates a programmable prescale circuit for implementation in a slave device embodiment that can accept a prescale factor for a corresponding on-board oscillator.

FIG. 6 illustrates a prescaler 600 for inclusion in a slave device 111-113. The receipt of a RESET PRESCALE command 601 will restart a prescaler counter 602. A serial-in, parallel-out shift register 604 clocks in the 12-bits of the prescale factor from the I²C Bus that was sent by master device 110. A prescale register 606 loads in the 12-bit prescale factor in parallel and holds it for reference during divide-by-N operations. Counter 602 then proceeds to count upwards at its 12-bit parallel output with each tick pwm_clk from the local on-board oscillator. A 12-bit digital comparator 610 waits for the count from counter 602 to match the prescale factor from register 606. When they match, a pulse 612 is output that triggers divide-by-two flip-flop 614 and causes a restart of counter 602 through OR-gate 616. The final divide-by-N operation appears on output 618.

Table-I, Table-II, and Table-III, show some pulse measurement examples that can be applied, e.g., to system 100 in FIG. 1.

TABLE I

With the I²C Bus in Fast Mode Plus, and the SCL clock running at 1 MHz, the Pulse width is four clocks of SCL clock line (4 μS):

Measurement command → 0000_1011 binary
slave device 111 measures 4 μS × 25.0 MHz → count = 100
slave device 112 measures 4 μS × 32.5 MHz → count = 130
slave device 113 measures 4 μS × 17.5 MHz → count = 70

TABLE II

With the I²C Bus in Fast Mode, and the clock of the SCL clock line running at 400-KHz, the Pulse width is two clocks of the SCL clock line (5 μS):

Measurement command → 0000_1001 binary
slave device 111 measures 5 μS × 25.0 MHz → count = 125
slave device 112 measures 5 μS × 32.5 MHz → count = 162.5, truncate to 162
slave device 113 measures 5 μS × 17.5 MHz → count = 87.5, truncate to 87

TABLE III

For the I²C Bus in Standard Mode, and the clock of the SCL clock line running at 100-KHz, the Pulse width is one clock of the SCL clock line (10 μS):

Measurement command → 0000_1000 binary
slave device 111 measures 10 μS × 25.0 MHz → count = 250
slave device 112 measures 10 μS × 32.5 MHz → count = 255 (overflow)
slave device 113 measures 10 μS × 17.5 MHz → count = 175

As seen in Table-III, there is an overflow condition in slave device 112, so the choice of an SCL clock of 100-KHz will not work. The minimum SCL clock frequency is 254/32.5 MHz=7.82 μS, or 128-KHz. (Note, "254" is used in the above equation because "255" indicates an overflow condition.) If lower SCL clock frequencies than that are required, then the bit-width of the measurement counter must be greater than 8-bits. The I²C Bus 104 is an 8-bit bus, so adding to the width of the counter will require an extra read sequence to retrieve more bytes that describe the entire count.

An I²C Bus master device 110 can then read a measurement register in each slave device 111-113 using standard I²C Bus protocol. The oscillator frequency for each device can be calculated, as in Table-IV and Table-V, for example, using, Device oscillator frequency=((SCL clock frequency)/n)× measurement read, where n is the pulse width count. The I²C Bus in Standard Mode is not calculated.

TABLE IV

I²C Bus in Fast Mode Plus, SCL clock at 1.00-MHz, n = 4:

slave device 111 oscillator → (1 MHz/4) × 100 = 25.0 MHz
slave device 112 oscillator → (1 MHz/4) × 130 = 32.5 MHz
slave device 113 oscillator → (1 MHz/4) × 70 = 17.5 MHz

TABLE V

I²C Bus in Fast Mode, SCL clock at 400-KHz, n = 2:

slave device 111 oscillator → (400-KHz/2) × 125 = 25.0 MHz
slave device 112 oscillator → (400-KHz/2) × 162 = 32.4 MHz
slave device 113 oscillator → (400-KHz/2) × 87 = 17.4 MHz If the I²C Bus master device 110 knows the actual SCL clock frequency, it can use that frequency in its calculations. Ideally, the master device measures the time the actual pulse is high on the SDA data line. If an absolute measurement of the frequencies is unnecessary, as in applications where the blink rate is not critical but their blinking altogether synchronously is, then a virtual frequency can be assumed and the measurements and corrections will all have the same relative basis.

An appropriate device prescale factor is calculated. The nominal prescale divide is 1024, with 1023 being used in the equation below because of how the prescale is implemented in the examples.

The prescale factor is equal to the calculated device frequency divided by the nominal oscillator frequency, times 1023, and rounded, e.g., {(calculated device frequency)/(nominal oscillator frequency)}×1023.

Using a nominal oscillator frequency, in one example of 25.00-MHz, Table-VI and Table-VII show the calculations.

TABLE VI

I²C Bus in Fast Mode Plus, SCL clock at 1 MHz:

slave device 111 Prescale → (25.0 MHz/25 MHz) × 1023 = 1023
slave device 112 Prescale → (32.5 MHz/25 MHz) × 1023 = 1329.9 = 1330
slave device 113 Prescale → (17.5 MHz/25MHz) × 1023 = 716.1 = 716

TABLE VII

I²C Bus in Fast Mode, SCL clock at 400-KHz:

slave device 111 Prescale → (25.0 MHz/25 MHz) × 1023 = 1023
slave device 112 Prescale → (32.4 MHz/25 MHz) × 1023 = 1325.8 = 1326
slave device 113 Prescale → (17.4 MHz/25 MHz) × 1023 = 712

The I²C Bus master device writes the calculated prescale factors into the prescale register using standard I²C protocol. The results are summarized in Table-VIII for an SCL clock of 1.00 MHz, and in Table-IX for an SCL clock of 400 Hz.

TABLE VIII

For the I²C Bus in Fast Mode Plus, SCL clock at 1.00 MHz:

| | |
|---|---|
| slave device 111 Blink Frequency: | {(25.0 MHz/(1023 + 1))/2}/ 512 = 23.84185 Hz |
| slave device 112 Blink Frequency: | {(32.5 MHz/(1330 + 1))/2}/ 512 = 23.84544 Hz |
| slave device 113 Blink Frequency: | {(17.5 MHz/(716 + 1))/2}/ 512 = 23.83520 Hz |
| If the user wants all LEDs to blink at a 1.00 Hz rate, the new blink rates will actually be: | |
| slave device 111 Blink Rate: | (23 + 1)/23.84185 Hz = 1.00663 seconds |
| slave device 112 Blink Rate: | (23 + 1)/23.84544 Hz = 1.00648 seconds |
| slave device 113 Blink Rate: | (23 + 1)/23.83520 Hz = 1.00691 seconds |

TABLE IX

For I²C Bus in Fast Mode, SCL clock at 400 Hz:

| | |
|---|---|
| slave device 111 Blink Frequency: | {(25.0 MHz/(1023 + 1))/2}/ 512 = 23.84185 Hz |
| slave device 112 Blink Frequency: | {(25.0 MHz/(1326 + 1))/2}/ 512 = 23.91731 Hz |
| slave device 113 Blink Frequency: | {(17.5 MHz/(712 + 1))/2}/ 512 = 23.96892 Hz |
| If the user wants all LEDs to blink at a 1.00 Hz rate, the new Blink Rates are: | |
| slave device 111 Blink Rate: | (23 + 1)/23.84185 Hz = 1.00663 seconds |
| slave device 112 Blink Rate: | (23 + 1)/23.91731 Hz = 1.00346 seconds |
| slave device 113 Blink Rate: | (23 + 1)/23.96892 Hz = 1.00130 seconds |

The blink rates are not exact, so the I²C Bus master device 110 should periodically send the RESET PRESCALE general call command to restart all of the prescale counters in slave devices 111-113 at zero. This will resynchronize and restart all of the prescale counters at the same time.

Over time, the respective oscillators in slave devices 111-113 will independently drift in frequency, e.g., due to temperature differences and other factors. The calibration method can be used at any time to re-calibrate and reset the starting times so they all fall back into step.

FIG. 7 illustrates a master device 700 in an embodiment for use on the I²C Bus, and is equivalent to master device 110 in FIG. 1. Master device 700 has a controller 702 that is able to issue a MEASURE PULSE and a RESET PRESCALE pair of general call commands on a standardized I²C Bus. The MEASURE PULSE command requests corresponding slave devices to return a measurement factor related to their local, otherwise private oscillator. The RESET PRESCALE command tells the corresponding slave devices to accept a prescale factor that follows that has been specifically calculated for it to normalize its local private oscillator with a prescale correction. A calculator 704 computes the measurements 706 gathered and computes an appropriate prescale factor 708 for each of many slave devices which will harmonize their collective operation. An initial calibration trigger 710 provides the first impetus for all of the slave devices to have their oscillators normalized to the same frequency, or nearly the same frequency as the digital granularity allows. A periodic calibration trigger 712 is used to keep long-term drift of the individual slave device oscillators under control, it can also be used to re-zero the starting points of the dividers when their respective digital granularity has caused less-than-ideal division quotients to be loaded as prescale factors.

FIG. 8 illustrates a slave device 800 in an embodiment for use on the I²C Bus, and is equivalent to any of slave devices 111-113 in FIG. 1. Slave device 800 has a controller 802 that is able to respond to a MEASURE PULSE and a RESET PRESCALE pair of general call commands from a standardized I²C Bus. A local on-board oscillator 804 produces a raw frequency output 806 that is free-running and that can vary from slave device-to-slave device due to component and temperatures variations. A programmable prescaler 808 allows this raw frequency to be prescaled into a corrected frequency output 810. The programmable prescaler 808 is similar to prescaler 600 shown in FIG. 6.

Ideally, a group of slave devices 800 on the same I²C Bus can have their oscillators collectively corrected by appropriate prescaling so that their respective corrected frequency outputs 810 all match one another. A programmable divider 812 allows application programs to control the frequency, pulse-width, or one-shot time of a final output 814. A measurement circuit 816 is similar to circuit 300 in FIG. 3. It takes a sample of the raw frequency output 806 according to measurement windows controlled by an I²C Bus SDA data line signal 818 and an SCL clock line signal 820. A measurement 822 is output and forwarded by the slave device controller 802 to a master device when it receives a MEASURE PULSE command.

FIG. 9 illustrates a master device embodiment of a method 900 for issuing MEASURE PULSE commands to collect oscillator measurements from a plurality of slave devices, for computing appropriate prescale factors, and for issuing RESET PRESCALE commands to write the computed prescale factors to respective slave devices on an I²C Bus. The bit-structures can be like those of FIGS. 2 and 5, respectively. A step 902 is an initial calibration trigger that gets the loop started the first time, e.g., after a power up reset. A step 904 issues a general call command, MEASURE PULSE, to the I²C Bus. A responsible slave device will respond with an acknowledgement and a measurement of its own raw oscillator frequency. That measurement is received in a step 906 and used in the computing of an appropriate prescale factor in step 908. Once the computed prescale factor is ready, a step 910 issues a general call command, RESET PRESCALE, to the I²C Bus. The next one or two bytes sent in a step 912 are data with the prescale factor, e.g., 10-bits wide. The process is repeated for all of the slave devices that need to have their oscillators harmonized, and different methods of broadcast and collection can be used apart from the ones described in particular here. A periodic calibration trigger 914 repeats the process every so often to keep constituent oscillator drift under control.

FIG. 10 illustrates a slave device embodiment of a method 1000 for responding to MEASURE PULSE commands from a master device wanting to collect oscillator measurements from a plurality of slave devices. Method 1000 also provides for accepting appropriate prescale factors when it receives a RESET PRESCALE command on an I²C Bus. The bit-structures can be like those of FIGS. 2 and 5, respectively. A step 1002 receives a general call command, MEASURE PULSE, on the I²C Bus. The slave device will respond by collecting a measurement in step 1002, e.g., using the circuitry of FIG. 3. That measurement is sent in a step 1006 and used by the master device in the computing of an appropriate prescale factor. Once the computed prescale factor is ready, a step 1008 receives a general call command, RESET PRESCALE, from the I²C Bus. The next one or two bytes are the data with the prescale factor, e.g., 10-bits wide. A step 1010 resets the prescale divider, and a step 1012 loads the programmable prescale divider, e.g., using the circuits of FIG. 6. The slave device now has its oscillator harmonized with the other oscillators on the other slave devices in the system.

More sophisticated embodiments reduce the user interactions required by the foregoing to only requiring the user to send the frequency of the SCL clock. Such is described in kilohertz within an otherwise ordinary I²C Calibration command. The necessary calculations are begun within each device once the appropriate command is received.

Calibrated oscillators can have cost disadvantages, e.g., they need additional silicon area that shares space with the non-volatile memory and calibration circuitry. There is also a cost added for the time needed for calibration. Frequency differences will still exist in these devices, they are just not as pronounced in uncalibrated devices.

Each device requires a fixed-point multiplier, a calibration state machine, and knowledge of the I²C General Call Commands used to enter into an Auto Calibration Mode. Such Auto Calibration function can be run in background while the device is performing its primary functions.

Figure 11:
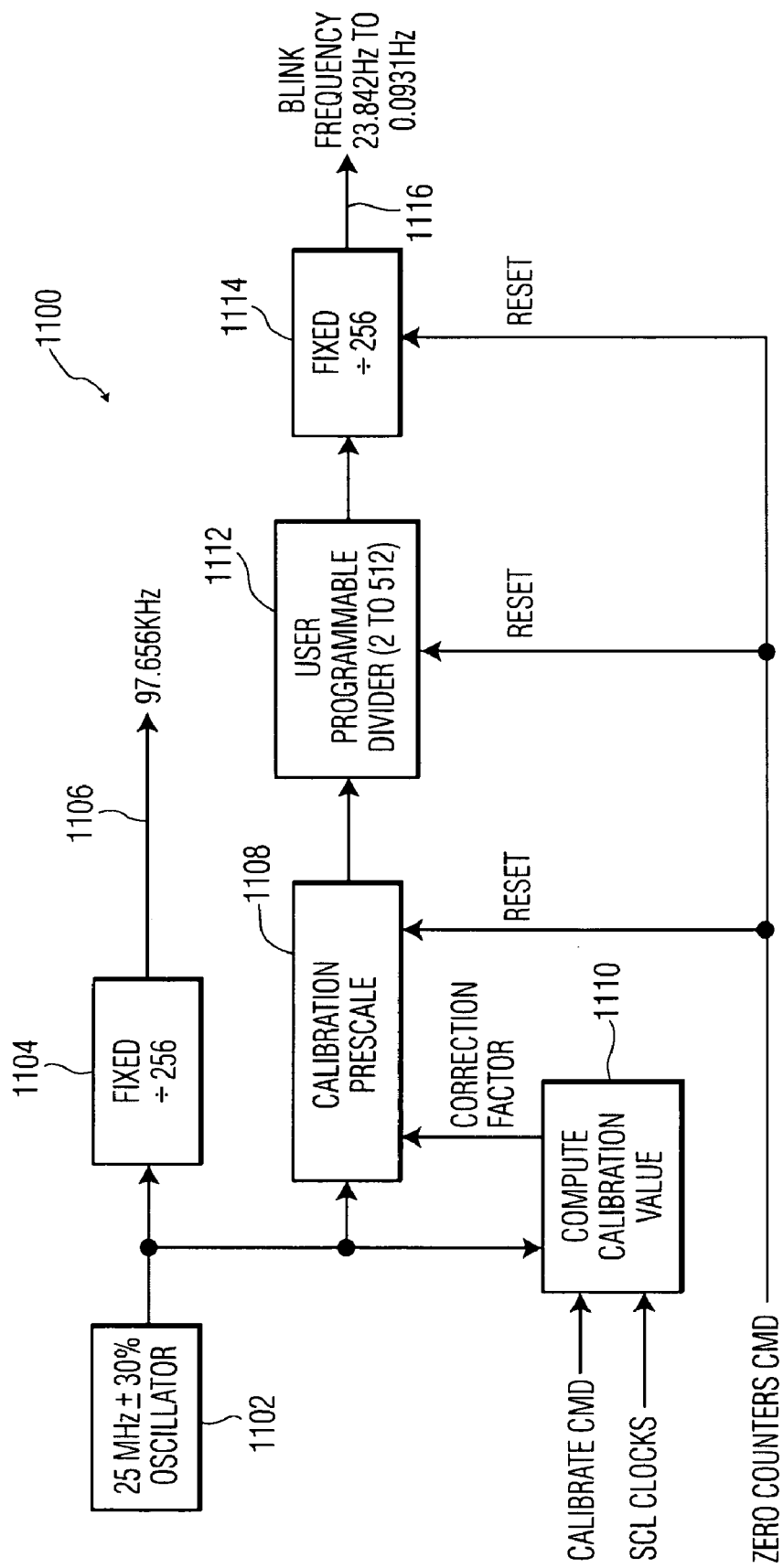
FIG. 11 illustrates an LED blinker device embodiment of an I²C bus slave device application which can respond to CALIBRATE and ZERO COUNTERS General Call commands.

FIG. 11 represents an LED blinker device 1100 for an I²C bus application that includes an oscillator 1102 and a fixed prescale counter 1104 that will produce a fixed rate clock 1106. For example, with an oscillator frequency of 25 MHz, and a fixed prescale value of "256", clock 1106 will nominally be about 97.656 KHz. A second part is used to generate user-programmable frequencies or blink rates, such as for an LED.

A calibration prescale 1108 is programmed automatically with a correction factor that compensates for a large part of the frequency errors of oscillator 1102. The calibration prescale 1108 typically has a default divide value set to "2048", e.g., binary 1000_0000_0000. A correction factor is computed in calibration device 1110 by counting, for example, the number of cycles output by oscillator 1102 during the twenty-seven SCL clocks that are required to communicate a CALIBRATE general call command over the I²C bus.

A user-programmable divider 1112 is available to users and can be loaded with a range of divider values, e.g., 2-256, for different blinker rates in LED driver applications. A fixed divider 114 then outputs a user selected frequency output 1116 that is at least partially frequency compensated and much closer to nominal values in spite of rather loose production and operational tolerances.

The oscillator frequencies and tolerances given in FIG. 11 are examples used only here for sake of discussion. Other frequencies and tolerances could, of course, also be generated. In real world practice, the ±30% output frequency from oscillator 1102 could vary 17.5 MHz to 32.5 MHz. The resulting blink frequency 1116 would also have the same high level of uncertainty.

The essential aspect here is that a system-wide SCL clock is used as a universal basis to calibrate or correct independent oscillators on different I²C bus devices.

Figure 12:
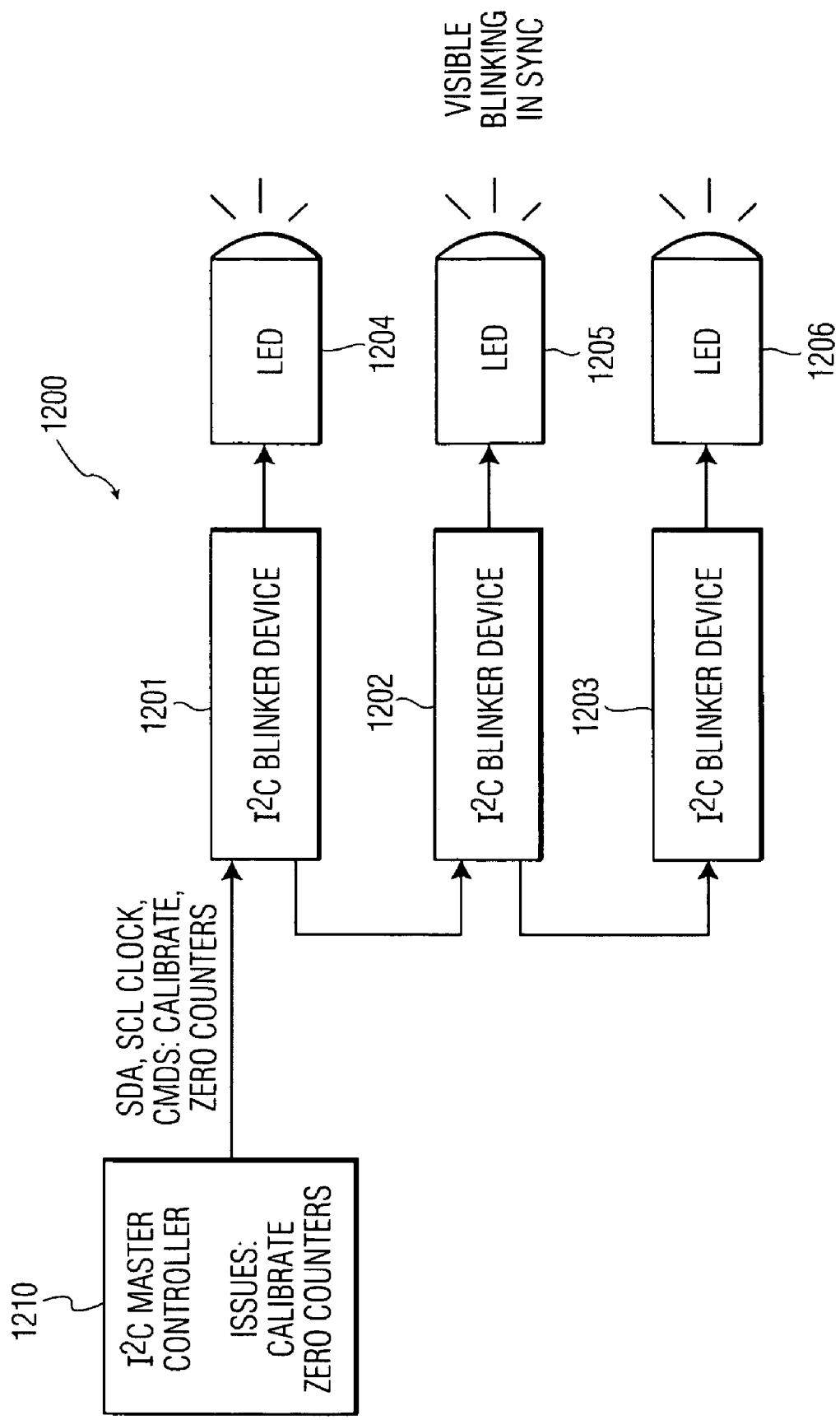
FIG. 12 illustrates an application in which an I²C bus master controller can harmonize three LED blinker devices like that of FIG. 11 using CALIBRATE and ZERO COUNTERS General Call commands.
Figure 13:
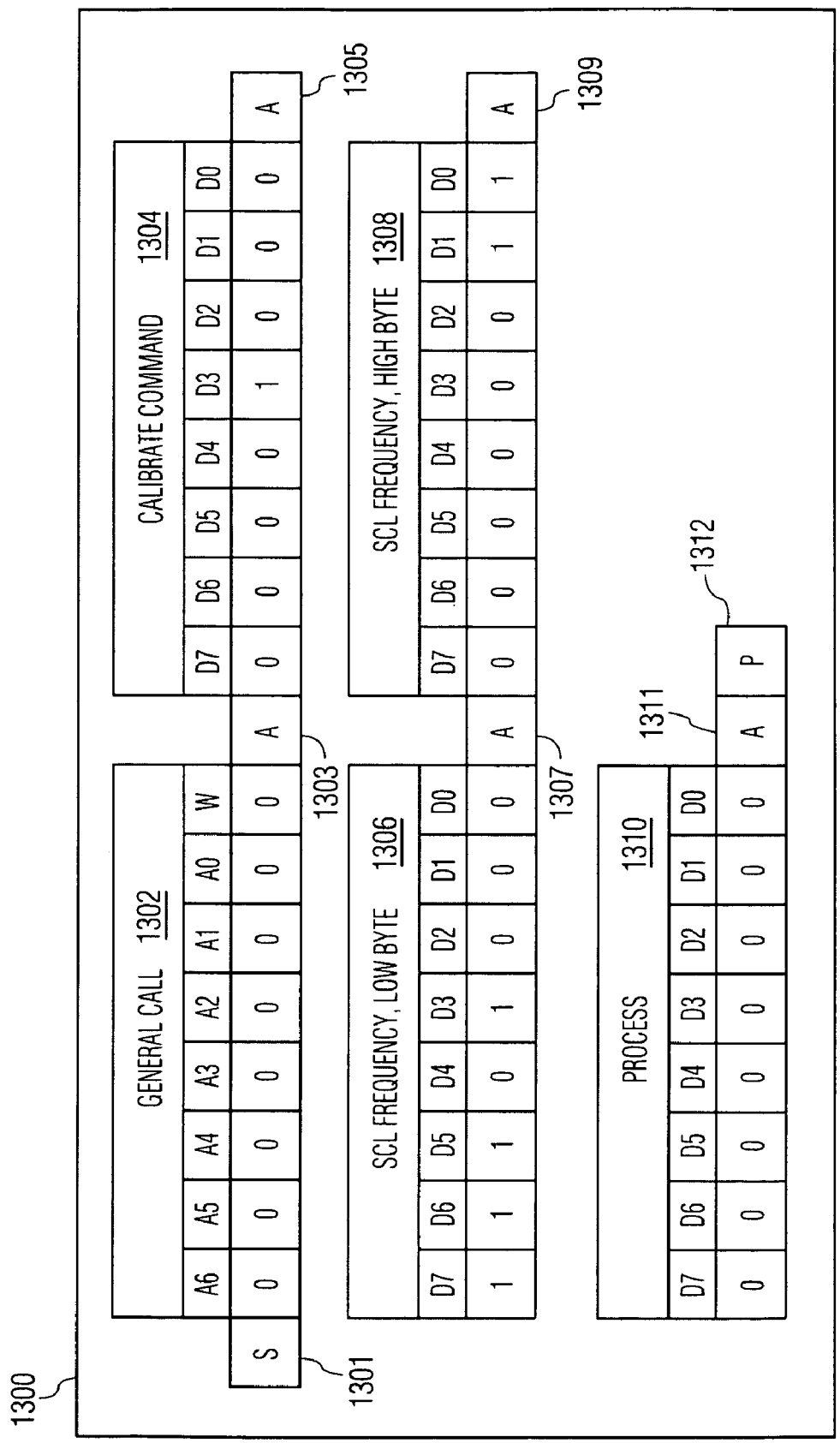
FIG. 13 illustrates the bit serial construction of a CALIBRATE General Call commands useful in the examples of FIGS. 11 and 12.
Figure 14:
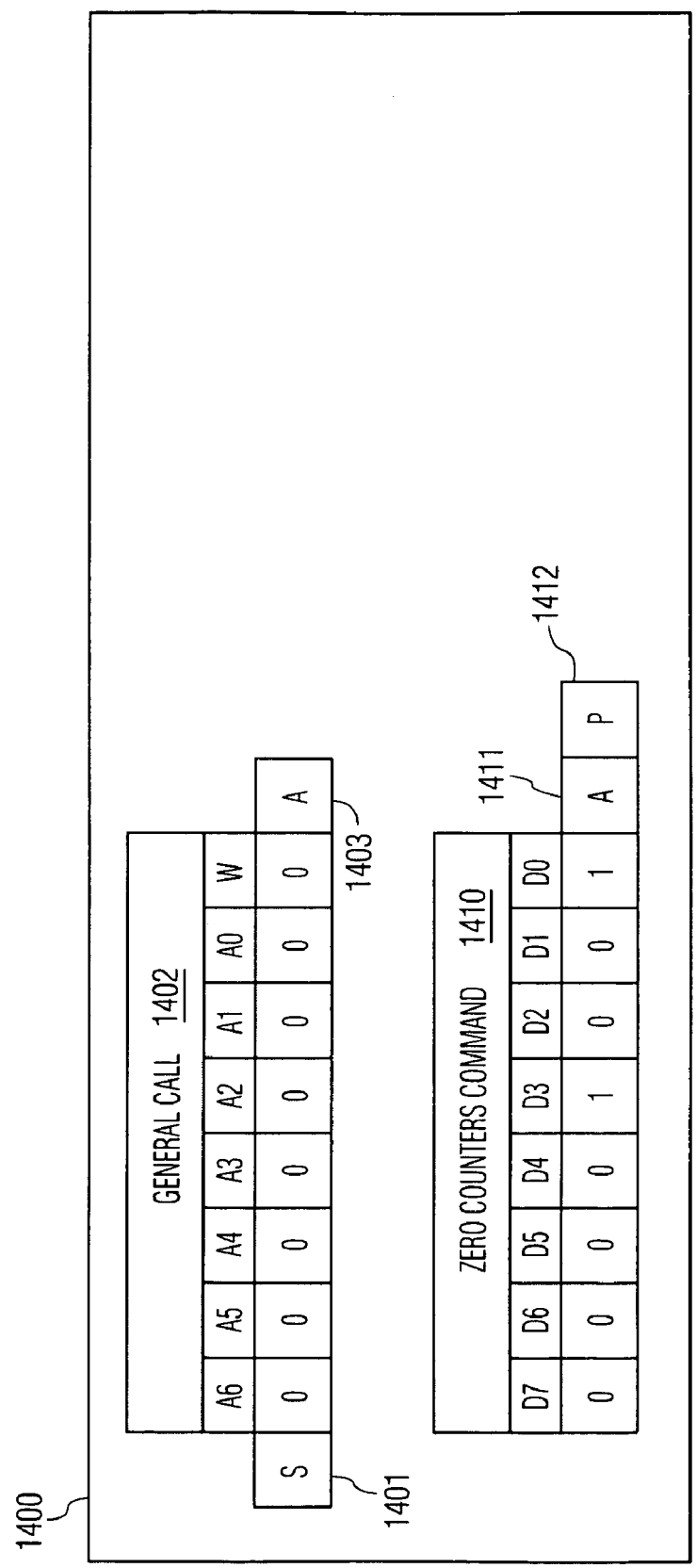
FIG. 14 illustrates the bit serial construction of a ZERO COUNTERS General Call commands useful in the examples of FIGS. 11 and 12.

FIG. 12 represents an application 1200 in which three LED blinkers 1201-1203 are connected to independently drive three discrete LEDs 1204-1206. Each LED blinker 1201-1203 is similar to blinker device 1100, and the object is to blink LEDs 1204-1206 in synchronism. The problem is that the three blinker devices 1201-1203 each have their own free running oscillators, and the blinking of LEDs 1204-1206 would appear to the eye to be unsynchronized were it not for the present method and device embodiments. An I²C master controller 1210 is able to issue CALIBRATE and ZERO COUNTERS General Call commands, e.g., as represented in FIGS. 13 and 14. The LED blinkers 1201-1203 are I²C slave devices able to respond to such CALIBRATE and ZERO COUNTERS General Call commands. I²C master controller 1210 further includes a trigger providing for a periodic issuance of said CALIBRATE command and ZERO COUNTERS General Call commands.

Given three different LED Blinkers 1201-1203, and the ±30% tolerances that can occur, the first could have an oscillator 1102 (typical of FIG. 11) running right at the nominal 25.00 MHz, the second one's oscillator 1102 could be +30% at 32.50 MHz, and the third one's oscillator 1102 could be −30% putting out 17.50 MHz. If the user programmable divider 1110 in each of the LED Blinkers 1201-1203 is set to divide-by-two, then the blink frequency outputs to LEDs 1204-1206 will respectively be:

Blinker 1201: 25.000 MHz/2048/2/256=23.842 Hz;
Blinker 1202: 32.500 MHz/2048/2/256=30.994 Hz; and
Blinker 1203: 17.500 MHz/2048/2/256=16.689 Hz;
And, the blink rate will be:

$$\frac{(N+1)}{\text{Blink\_Frequency}},$$

where N is a number, 0 to 255, is the value that should be loaded into each of the three user programmable dividers 1110 to compensate for the differences within the ±30% range of tolerance. The blinking LEDs 1204-1206 then should appear to the eye to more or less all blink at the same rate.

In one example, if a user wants the three LEDs 1204-1206 to blink at a 1 Hz rate, the ideal blink frequency would be 24 Hz, and the ideal oscillator frequency would be 25.16582 MHz (24 Hz×512×2×1024). A 1 Hz blink rate would simply require loading a value of "23" into the blink rate register, e.g., user programmable divider 1110 (FIG. 11). But, given the ±30% tolerances in the above example, the three resulting blink rates, as in FIG. 12, could be very different:

Blinker 1201: $\frac{(23+1)}{23.842 \text{ Hz}} = 1.0066$ seconds;

Blinker 1202: $\frac{(23+1)}{30.994 \text{ Hz}} = 0.7743$ seconds; and

Blinker 1203: $\frac{(23+1)}{16.689 \text{ Hz}} = 1.4381$ seconds.

The solution here is to adjust the value of calibration prescale 1108 from its default value of "2048". The value is adjusted to reduce the blink frequency errors that occur because of the tolerances possible, the real operational differences that occur between otherwise identical devices. Making the appropriate adjustments depends on being able to determine the true clock frequency of each oscillator 1102, or how they all compare to some standard clock. In an I²C system as shown in FIG. 12, the SCL clock can be used as a standard for relative comparison. The absolute frequencies do not need to be determined with precision.

The I²C system-wide SCL clocks seen at each LED blinker 1201-1203 can be used as a basis to calculate respective frequencies of their respective local oscillators 1102. Such calculation in calibration device 1110 is triggered by newly defined I²C Bus General Call Commands.

FIG. 13 represents an I²C bus CALIBRATE general call command 1300 that begins with a start bit (S) 1301, a General Call byte 1302, an acknowledge bit (A) 1303, a CALIBRATE command byte 1304, an acknowledge bit (A) 1305, an SCL frequency lower byte 1306, an acknowledge bit (A) 1307, an SCL frequency upper byte 1308, an acknowledge bit (A) 1309, a process byte 1310, an acknowledge bit (A) 1311, and a stop (P) bit 1312.

The twenty-seven SCL clock measurement period mentioned for calibration device 1110 occurs during the transmission of the CALIBRATE command byte 1304, acknowledge bit (A) 1305, SCL frequency lower byte 1306, acknowledge bit (A) 1307, SCL frequency upper byte 1308, and acknowledge bit (A) 1309, over the I²C bus.

CALIBRATE command 1300, is shown in FIG. 13 in a bit-serial I²C data flow format, and each bit takes one SCL clock period. The SCL frequency values are expressed in units of KHz. In one example, the SCL frequency is 1000 KHz, e.g., "3E8" hex.

The number of oscillator clocks produced locally on each LED blinker 1201-1203 by corresponding oscillators 1102 are counted during the common period spanned by the communication of the CALIBRATE Command, a total of twenty-seven SCL clock periods. The resulting counts collected respectively for each LED blinker are then used independently by all three to compute a calibrated blink prescale correction factor needed locally in the respective prescale counter 1108. The SCL frequency is described as two bytes, upper and lower in the CALIBRATE command. That number is divided by the number of SCL clocks in the measurement period, here that will be twenty-seven. That result is multiplied by how many local oscillator clocks that occurred in that measurement period. The result is the true local oscillator frequency. This can be expressed mathematically by:

EQUATION-1

$$\left(\frac{\text{SCL\_frequency}}{\text{num\_SCL\_clocks}}\right) \times \text{osc\_clock\_count} = \text{osc\_frequency} \quad (1)$$

The true local oscillator frequency is divided by the ideal oscillator frequency, and multiplied by the ideal blink prescale value. This results in a calibrated blink prescale value, that can be expressed mathematically by:

EQUATION-2

$$\left(\frac{\text{osc\_frequency}}{\text{ideal\_osc\_freq}}\right) \times \text{ideal\_blink\_prescale} = \text{calibrated\_blink\_prescale}$$

Combining EQUATION-1 and EQUATION-2, the SCL frequency times the oscillator clock count, times a constant, $$\left(\frac{2048}{(25000 \times 27)}\right),$$

is the calibrated blink prescale, or the "correction factor" in FIG. 11 sent by calibration device 1110 to calibration prescale 1108, and is expressed mathematically by:

$$\left(\frac{\text{ideal\_blink\_prescale}}{(\text{ideal\_osc\_freq} \times \text{num\_SCL\_clocks})}\right) \times$$

$$\text{SCL\_frequency} \times \text{osc\_clock\_count} = \text{calibrated\_blink\_prescale}$$

Reducing:

$$\left(\frac{2048}{(25000 \times 27)}\right) \times \text{SCL\_frequency} \times \text{osc\_clock\_count} =$$

$$\text{calibrated\_blink\_prescale}$$

Yields:

$$\text{SCL\_frequency} \times \text{osc\_clock\_count} \times 0.003034074 =$$

$$\text{calibrated\_blink\_prescale}$$

Preferably, a 24-bit fixed-point multiplier is included in calibration device 1110 for these calculations. This can require converting constants into 24-bit fixed-point numbers, e.g.:

$$\text{cal\_const} = \text{INT}\left[\frac{\left(\left(\frac{0.003034074}{2^{-24}}\right) \times 10\right) + 5}{10}\right] = 50{,}903$$

A blink clock prescale is thus calculated for each device, e.g., LED blinkers 1201-1203. The "cal_const" value is not an exact conversion, but an approximation and constant number, 0.003034055, that can be used, e.g.:

Given, SCL Frequency=1 MHz=1000 KHz=1 μS cycle time;

For Blinker 1201, the osc_clock_count=1 μS'27×25.000 MHz=675.0=675 counts;

For Blinker 1202, the osc_clock_count=1 μS×27×32.500 MHz=877.5→truncated→877 counts;

For Blinker 1203, the osc_clock_count=1 μS×27×17.500 MHz=472.5→truncated→472 counts;

And, calibrated_blink_prescale=osc_clock_count×SCL_frequency×cal_const.

For Blinker 1201, its calibrated blink prescale,=675× 1000×0.003034055=2047.997125→rounded→2048;

For Blinker 1202, its calibrated blink prescale=877×1000× 0.003034055=2660.866235→rounded→2661;

For Blinker 1203 its calibrated blink prescale,=472×1000× 0.003034055=1432.073960→rounded→1432.

Calculating the new blink clock frequencies with the user programmable divider 1112 be set to divide-by-2. The blink frequencies are:

Blinker 1201: 25.000 MHz/2048/2/256=23.842 Hz;
Blinker 1202: 32.500 MHz/2661/2/256=23.854 Hz; and
Blinker 1203: 17.500 MHz/1432/2/256=23.868 Hz, Calculating the new blink rates:

Blinker 1201: $\frac{(23+1)}{23.842 \text{ Hz}} = 1.0066$ seconds;

Blinker 1202: $\frac{(23+1)}{23.854 \text{ Hz}} = 1.0061$ seconds; and

Blinker 1203: $\frac{(23+1)}{23.868 \text{ Hz}} = 1.0055$ seconds.

And, the original blink rates were:

Blinker 12011: $\frac{(23+1)}{23.842 \text{ Hz}} = 1.0066$ seconds;

Blinker 1202: $\frac{(23+1)}{30.994 \text{ Hz}} = 0.7743$ seconds; and

Blinker 1203: $\frac{(23+1)}{16.689 \text{ Hz}} = 1.4381$ seconds.

Even after calibration, the blink rates for each LED 1204-1206 will be slightly different due to divider granularities. Combined with the corresponding local oscillator drift due to temperature and other factors, over time, the blinking of the three LEDs 1204-1206 can slip noticeably out of synchronization.

So a second I²C bus General Call Command, ZERO COUNTERS, is needed, and is represented in FIG. 14. As shown in FIG. 11, the receipt of ZERO COUNTERS is connected, for example, to reset dividers 1108, 1110, and 1112, and thus resynchronizes all the LED blinkers, such as 1201-1203 in a system 1200, to a common starting count. Both the CALIBRATE and the ZERO COUNTERS General Call commands can be sent automatically at any time during operation from a I²C bus master controller common to all the I²C bus slave devices. For example, configured as in FIG. 12.

Embodiments can be used in applications that require on-demand harmonization of otherwise independent clocks. The methods described here include adjusting a relatively small prescale counter of 8-bits width, but a prescale of differing bit widths and counts is entirely possible.

In an alternative embodiment, the individual I²C bus slave devices could skip determining their own exact local oscillator frequencies and would not need the I²C bus master controller to tell them the SCL clock frequency. Calibration devices 1110 on respective LED blinkers 1201-1203, for example, could all assume the SCL clock frequency is some constant. They would use that constant compared to their own local oscillators as a norm to calculate their own prescale correction factors. The object is to harmonize the clocks to one another, not primarily to correct their absolute frequency accuracies. This could eliminate having to communicate the upper and lower SCL frequency bytes 1306 and 1308 (FIG. 13) in the General Call CALIBRATE command 1300.

In general, the method, protocol, device, and system embodiments described act to harmonize the oscillator frequencies of a plurality of I²C Bus slave devices sharing a particular I²C Bus. A prescale factor is calculated from an automatic measurement obtained. The prescale factor is loaded into a programmable prescale divider associated with an oscillator providing the raw operating frequency. The estimating, calculating, and loading are conducted for a plurality of slave devices on the particular I²C Bus to harmonize the respective output frequencies of each programmable prescale divider.

Although specific embodiments of the invention have been described and illustrated, the invention is not to be limited to the specific forms or arrangements of parts as described and illustrated herein. The invention is limited only by the claims.

What is claimed is:

1. A method for harmonizing the after-prescaled oscillator frequencies of a plurality of I²C Bus slave devices, comprising:

estimating a raw operating frequency of each oscillator on an individual I²C Bus slave device by counting how many independent local oscillator cycles occur during a measurement window period spanned by a fixed number of serial clock line (SCL) transitions observed in a particular I²C Bus common to the plurality of I²C Bus slave devices;

automatically calculating a prescale factor from a measurement obtained in the step of estimating; and automatically loading said prescale factor into a corresponding programmable prescale divider associated with an oscillator providing said raw operating frequency;

wherein, the estimating, calculating, and loading when conducted for a plurality of I²C Bus slave devices on said particular I²C Bus results in a harmonization of the respective output frequencies of a respective programmable prescale divider.

2. The method of claim 1, further comprising:

sending a CALIBRATE general call command over said particular I²C Bus from a I²C Bus master device to each said I²C Bus slave device to trigger the step of estimating.

3. The method of claim 1, further comprising:
driving a corresponding plurality of LEDs with said plurality of I²C Bus slave devices in order to blink the LEDs on and off;
wherein, said harmonization of the respective output frequencies of said respective programmable prescale dividers produces an apparent synchronization of the blink rates of individual ones of said plurality of LEDs.

4. The method of claim 1, further comprising:
sending a ZERO COUNTERS general call command over said particular I²C Bus from a I²C Bus master device to each said I²C Bus slave device to resynchronize prescale counting.

5. The method of claim 1, further comprising:
sending a CALIBRATE general call command over said particular I²C Bus from a I²C Bus master device to each said of plurality of I²C Bus slave devices to respectively trigger the step of estimating;
driving a corresponding plurality of LEDs with said plurality of I²C Bus slave devices in order to blink the LEDs on and off; and
sending a ZERO COUNTERS general call command over said particular I²C Bus from a I²C Bus master device to each said I²C Bus slave device to resynchronize prescale counting;
wherein, said harmonization of the respective output frequencies of said respective programmable prescale dividers produces an apparent synchronization of the blink rates of individual ones of said plurality of LEDs.

6. An I²C Bus system, comprising:
a master device controller for issuing;
  a CALIBRATE command for provoking an I²C Bus slave device to sample a raw frequency output of an on-board local oscillator, and for calculating an oscillator prescale factor particular for said I²C Bus slave device, and for automatically loading an appropriate prescale factor in an associated programmable prescaler; and
  a ZERO COUNTERS command for restarting a programmable prescaler to said on-board local oscillator;
the master device controller selectively issuing the two general call commands, CALIBRATE and ZERO COUNTERS onto an I²C Bus with a plurality of said I²C Bus slave devices; and
  a I²C Bus slave device for responding to said two general call commands, CALIBRATE and ZERO COUNTERS, over said I²C Bus, and including a measurement circuit for taking a measurement of the operating frequency of said on-board local oscillator with reference to an SCL clock line of said I²C Bus, and including said programmable prescaler for automatic loading of a calculated correction factor.

7. The system of claim 6, wherein oscillator prescale factors are to be automatically computed by each I²C Bus slave device to harmonize any final output frequencies of on-board local oscillators of corresponding ones in said plurality of said I²C Bus slave devices.

8. The system of claim 6, further comprising:
a plurality of LEDs that are individually and independently driven by particular ones of said I²C Bus slave devices, and that can be controlled in unison.

9. The system of claim 6, further comprising:
a periodic calibration trigger providing for a periodic issuance of said CALIBRATE command and ZERO COUNTERS command to restart at least said programmable prescalers.

* * * * *